United States Patent
Downs

(10) Patent No.: US 6,686,016 B2
(45) Date of Patent: *Feb. 3, 2004

(54) THERMOPLASTIC ADHESIVE DISPENSING METHOD AND APPARATUS

(75) Inventor: John P. Downs, Colgate, WI (US)

(73) Assignee: Glue Dots International, LLC, New Berlin, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/125,012

(22) Filed: Apr. 18, 2002

(65) Prior Publication Data

US 2002/0122911 A1 Sep. 5, 2002

Related U.S. Application Data

(63) Continuation of application No. 09/998,950, filed on Nov. 15, 2001, now Pat. No. 6,640,864, which is a continuation of application No. 09/363,200, filed on Jul. 29, 1999, now Pat. No. 6,319,442, which is a continuation-in-part of application No. 08/909,189, filed on Aug. 11, 1997, now Pat. No. 5,935,670.

(60) Provisional application No. 60/036,896, filed on Feb. 6, 1997.

(51) Int. Cl.[7] .................................................. B32B 3/16
(52) U.S. Cl. ...................... 428/42.2; 206/411; 427/208; 428/40.1; 428/41.5; 428/41.8; 428/42.1; 428/906
(58) Field of Search ............................... 428/40.1, 41.3, 428/41.8, 42.1, 906, 42.2; 206/411; 427/208

(56) References Cited

U.S. PATENT DOCUMENTS

| | | |
|---|---|---|
| 2,373,092 A | 4/1945 | Avery |
| 2,838,171 A | 6/1958 | Kaspar |
| 2,912,140 A | 11/1959 | Cole |
| 3,225,916 A | 12/1965 | Field, et al. |
| 3,239,403 A | 3/1966 | Block |
| 3,267,623 A | 8/1966 | Block |
| 3,464,883 A | 9/1969 | Moline, et al. |
| 3,736,281 A | 5/1973 | Russell |
| 3,741,786 A | 6/1973 | Torrey |
| 3,881,041 A | 4/1975 | Glienke |
| 3,997,702 A | 12/1976 | Schurb et al. |
| 4,002,794 A | 1/1977 | Schwarcz |
| 4,211,805 A | 7/1980 | Chamberlin |
| 4,294,357 A | 10/1981 | Stevens et al. |
| 4,387,831 A | 6/1983 | McNally |
| 4,440,830 A | 4/1984 | Wempe |
| 4,537,934 A | 8/1985 | Fock et al. |
| 4,820,446 A | 4/1989 | Prud'Homme |
| 4,822,687 A | 4/1989 | Kessel et al. |
| 4,959,008 A | 9/1990 | Wasulko |
| 4,961,804 A | 10/1990 | Aurichio |
| 4,977,006 A | 12/1990 | Smith et al. |
| 5,049,434 A | 9/1991 | Wasulko |
| 5,344,681 A | 9/1994 | Calhoun et al. |
| 5,489,453 A | 2/1996 | Friesch |
| 5,935,670 A | 8/1999 | Downs |
| 6,319,442 B1 | 11/2001 | Downs |
| 6,433,055 B1 | 8/2002 | Kleyer et al. |

*Primary Examiner*—Nasser Ahmad
(74) *Attorney, Agent, or Firm*—Reinhart Boerner Van Deuren s.c.

(57) ABSTRACT

Hot melt thermoplastic adhesive is predeposited on a carrier strip having front and back release surfaces. The carrier strip is rolled into a coil compressing the thermoplastic hot melt into disks which may later be removed for use. The disks are spaced so that the carrier strip may be deformed to expose a single disk to a planar surface permitting simplified dispensing of the disks.

42 Claims, 2 Drawing Sheets

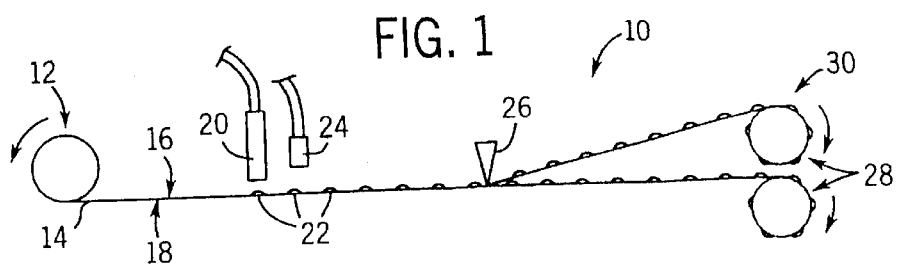
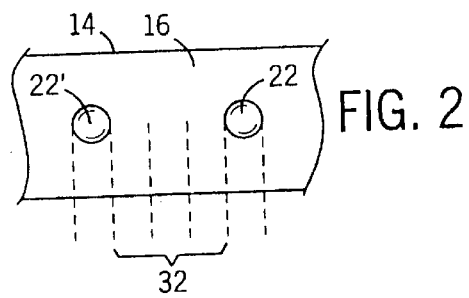
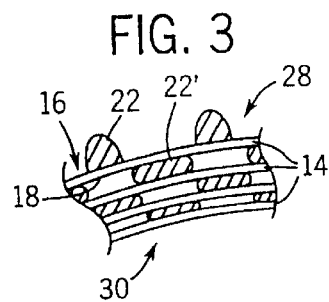
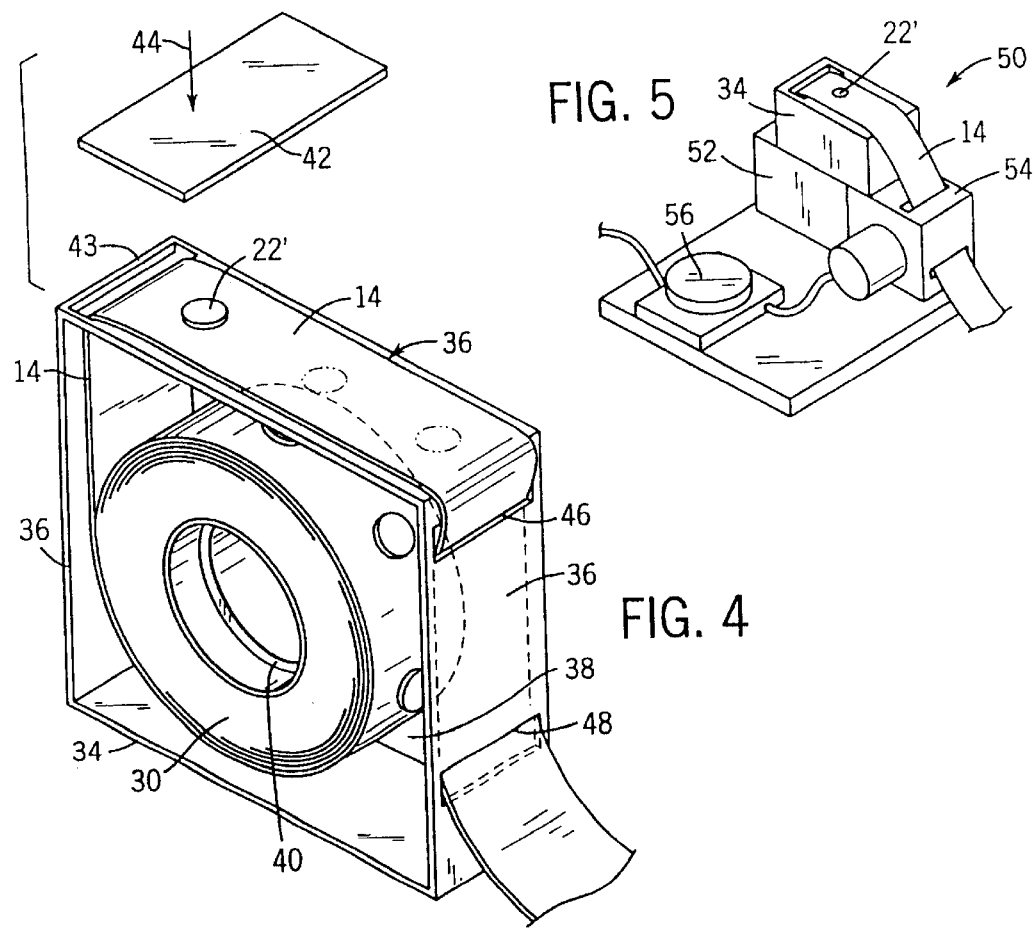
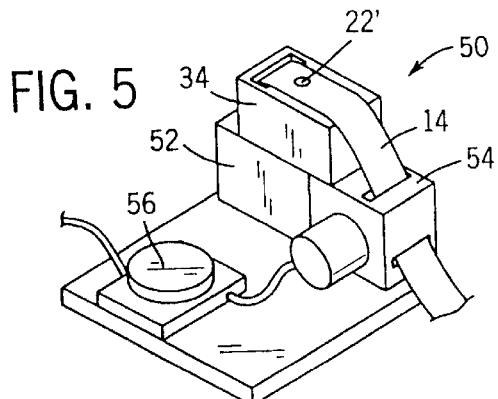

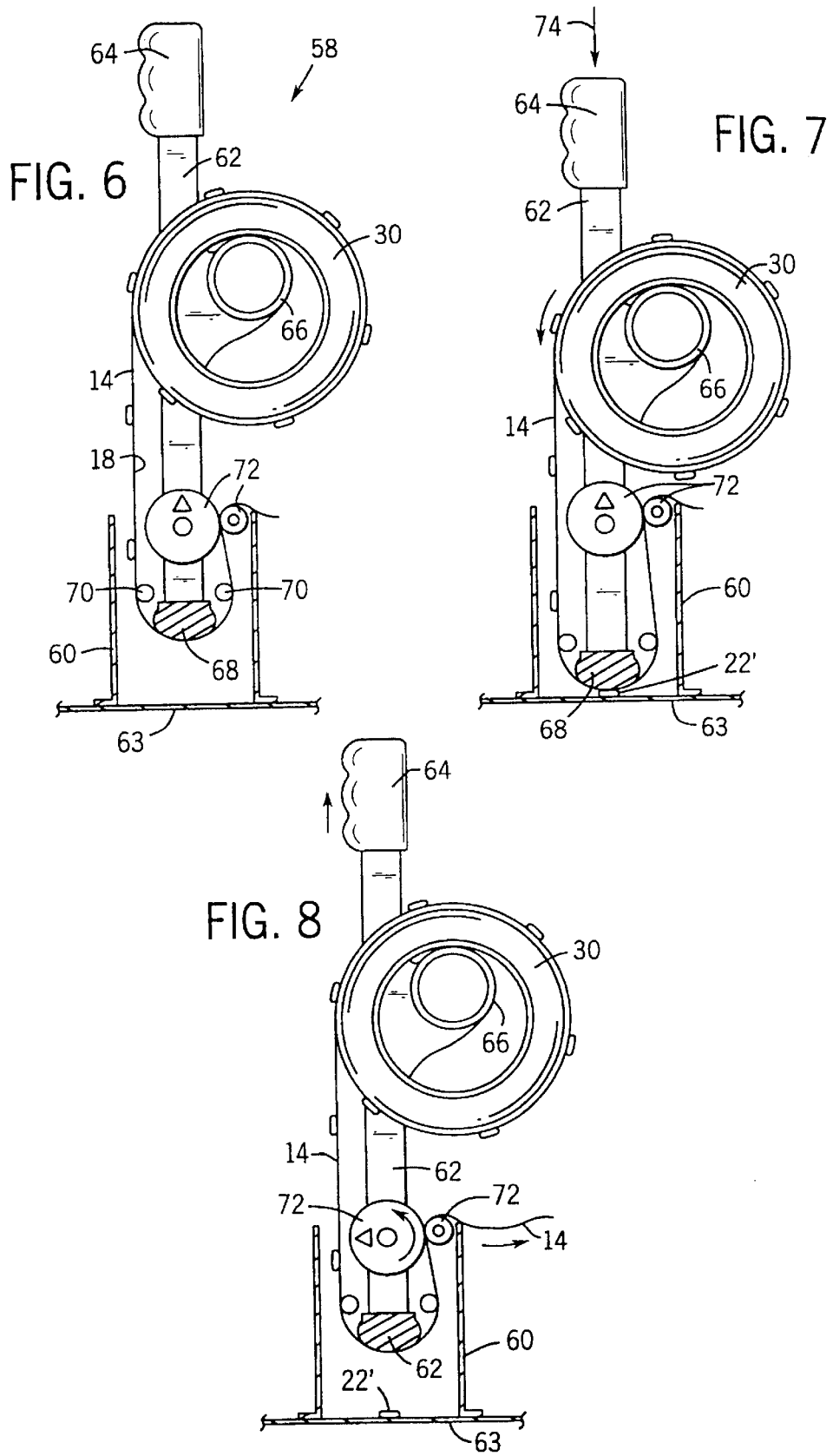

THERMOPLASTIC ADHESIVE DISPENSING METHOD AND APPARATUS

IDENTIFICATION OF RELATED APPLICATIONS

This patent application is a continuation of U.S. patent application Ser. No. 09/998,950, filed on Nov. 15, 2001, now U.S. Pat. No. 6,640,864, entitled "Thermoplastic Adhesive Dispensing Method and Apparatus," which is a continuation of U.S. patent application Ser. No. 09/363,200, filed on Jul. 29, 1999, now U.S. Pat. No. 6,319,442, entitled Process of Making a Thermoplastic Adhesive Dispensing Tape, which is in turn a continuation-in-part of U.S. patent application Ser. No. 08/909,189, filed on Aug. 11, 1997, now U.S. Pat. No. 5,935,670, entitled "Thermoplastic Adhesive Dispensing Method and Apparatus," which is in turn based upon U.S. Provisional Patent Application No. 60/036,896, filed on Feb. 6, 1997, all of which are assigned to the assignee of the present invention.

BACKGROUND OF THE INVENTION

In the preparation of mass mailings, for example, it is often desired to attach a card, such as a credit card or the like, to a carrier document so that the former can be peeled easily from the carrier document for use by a consumer. One method of making such an attachment uses a pressure-sensitive, thermoplastic adhesive. During the printing or collating process, a portion of the thermoplastic adhesive is metered onto the carrier document and the card pressed against this material. The equipment for this process includes a heating container for the thermoplastic adhesive and a metering pump that may be electrically actuated.

Thermoplastic adhesive can be difficult to work with. Its high melting temperature and adhesive properties present some risk of burn to untrained operators. The price of the equipment for dispensing the thermoplastic adhesive and positioning and placing the attachments makes such equipment impractical for low volume mailings.

SUMMARY OF THE INVENTION

The present invention provides a method and apparatus allowing thermoplastic pressure-sensitive adhesives to be used simply and safely by those who have low-volume requirements. In the present invention, pressure-sensitive thermoplastic adhesive is pre-metered onto a release strip which may be rolled into coil. The size and spacing of the metered dots of thermoplastic adhesive allows one dot to be exposed at a time across an anvil plate which may be used to press the dot against a card or the like. The carrier strip may be advanced between the pressing operation to bring a new dot into position.

The spacing of the dots along the strip provides simple methods of dispensing the dots including the use of a specially constructed cardboard dispenser box or the like or various automated metering systems and mechanisms to be described.

Specifically, the present invention provides a thermoplastic adhesive dispensing tape having a flexible carrier tape extending longitudinally and having a transverse width and having opposed first and second release surfaces. Thermoplastic adhesive dots are arrayed longitudinally along the first release surface so that the carrier tape may be curved about an axis to expose a single adhesive dot to an abutting planar surface.

Thus, it is one object of the invention to provide a simple means for dispensing thermal plastic adhesive dots without requiring the expense or hazard of molten thermoplastic adhesive.

The second release surface may adhere less strongly to the thermoplastic adhesive dot than does the first release surface.

Thus, it is another object of the invention to provide a thermoplastic adhesive dispensing tape that may be unwound from a coil with the thermoplastic dots being retained on the first release surface.

The invention includes a method of manufacturing the thermoplastic adhesive dispensing tape by unrolling the flexible carrier strip from a first reel to expose the first release surface and dispensing molten thermoplastic adhesive at periodic intervals on the unrolled carrier strip. The carrier strip is then rerolled to compress the dispensed molten thermoplastic adhesive into flat disks.

Thus, it is another object of the invention to provide for adhesive disks that approximate the size and area that would be provided by an automatic dispensing equipment directly on the surfaces to be adhered together. The action of adjacent coils of the carrier strip mimics that of a card or other planar surface pressing against a molten portion of thermoplastic adhesives.

The rerolling of the flexible carrier strip may be delayed until the thermoplastic adhesive has skinned over.

Thus, it is yet another object of the invention to ensure that the thermoplastic adhesive dots are retained by the first release surface which receives the thermoplastic adhesive in a molten state prior to it skinning over and therefore adheres to it more strongly.

The step of dispensing molten thermoplastic adhesive may simultaneously dispense at least two separate portions of thermoplastic adhesive at transversely separated locations. The method may include the further step of longitudinally slitting the flexible carrier strip between separate portions of the thermoplastic adhesive prior to rerolling the flexible carrier strip.

Thus, it is another object of the invention to provide for a high throughput manufacture of dots with a single dispensing unit without jeopardizing the cooling of the dots as is necessary to allow them to skin over.

The invention also includes a dispensing apparatus for the thermoplastic adhesive dispensing tape, including a reel support, for holding the thermoplastic adhesive dispensing tape in coiled configuration, and a guide for receiving the carrier tape after adhesive dots have been removed. An anvil surface is positioned between the reel and the guide to receive the thermoplastic adhesive dispensing tape as unreeled from the coil and deform the thermoplastic adhesive dispensing tape to expose a single adhesive dot to a planar surface.

Thus, it is another object of the invention to provide a rapid application technique for the thermoplastic adhesive dots on the tape of the present invention. The positioning of the dots so that a single dot may be exposed to a planar surface allows the dots to be readily applied to planar surfaces by a proper incrementing of the tape over a correctly sized anvil surface.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DESCRIPTION OF THE DRAWINGS

FIG. 1 is a schematic view of a manufacturing system for the present invention showing the dispensing of thermoplastic pressure-sensitive dots onto a carrier strip and the winding of the strip into coils;

FIG. 2 is a plan view of a section of a strip of the present invention showing the ultimate spacing of the dots when flattened;

FIG. 3 is a cross section through a coil of FIG. 1 showing the compression of the dots by adjacent coils of the release strip;

FIG. 4 is a perspective cut-away view of a container for dispensing the coils of FIG. 1 showing the spacing of the dots which permits a single dot to be exposed over an anvil surface for attachment to a card;

FIG. 5 is a perspective view of the container of FIG. 4 placed in an automatic tape advancing apparatus to pull the release strip a predetermined amount at the pressing of a palm button;

FIG. 6 is a simplified fragmentary cross section of a semi-automatic dispensing machine positioned for dispensing an adhesive dot on a carrier sheet prior to dispensing;

FIG. 7 is a view similar to that of FIG. 6 showing a downward activation of the apparatus of FIG. 6 advancing a dot from the carrier strip over a movable anvil surface to be pressed against the carrier sheet; and FIG. 8 is a figure similar to that of FIGS. 6 and 7 showing the upward return of the apparatus after dispensing, the return causing a tensioning of the used carrier strip in preparation of a second stroke.

DESCRIPTION OF THE PREFERRED EMBODIMENT

Referring to FIG. 1, an adhesive dot manufacturing machine 10 provides a back tensioned reel 12 holding a differential release carrier strip 14. The carrier strip 14 is a paper that has a silicon release material on opposed first and second surfaces 16 and 18 selectively applied so that surface 16 provides less release than surface 18.

The carrier strip 14 is dispensed from the tensioned reel 12 with surface 16 facing upward to move beneath a pair of thermoplastic glue metering nozzles 20 (only one of which is visible in FIG. 1) supplied by a metering pump not shown, to dispense side-by-side glue dots 22 onto surface 16 as surface 16 moves past nozzle 20. Air jet 24 directed on surface 16 then cools the glue dots 22 which are also cooled by natural convection as the carrier strip 14 moves along.

A slitting knife 26 divides the carrier strip 14 into multiple strips, each of which are then wound into coils 30 on take-up reels 28 under controlled tensioning. Capstan and idler wheels may also be provided so that the tension on reels 28 may be controlled independently of the tension provided by reel 12.

Referring now to FIG. 3, the glue dots 22 are initially mounded high on the surface 16 of the carrier strip 14, but as they are wound about the reel 28, each glue dot 22' is compressed beneath surface 18 of the carrier strip 14 of the next succeeding layer of carrier strip 14 and the surface 18 of the layer of the carrier strip 14 on which it was deposited so as to flatten the glue dots 22' into circular disks.

The differential release properties of surfaces 16 and 18, the fact that the glue dots 22 were initially applied in a hot state to surface 16 better adherence, and the fact that there is some cooling and hence "skinning over" of the glue dots 22 prior to the winding on reel 28, all ensure that the glue dots 22 remain adhered to surfaces 16 as the coil 30 is unwound.

Referring now to FIG. 2, the spacing of the glue dots 22' after flattening on the carrier strip 14 is such that the glue dots 22' do not overlap in the dimension defined by the extent of carrier strip 14. This ensures that there is a margin 32 in that dimension such that an individual glue dot 22 may be exposed for adhering to a card or the like without the risk of the card picking up multiple glue dots 22. Dots 22 and 22' of a preferred embodiment may be separated by three times their diameter.

Referring now to FIG. 4, the coil 30 may be inserted within a dispensing container 34 having generally rectangular configuration with top, side, and bottom walls 36 and a spanning vertical wall 38. Vertical wall 38 includes a coil support hub 40 extending laterally into the volume of the container 34 from the vertical wall 38 about which the coil 30 may be positioned. As positioned, the coil 30 is free to rotate along a horizontal axis with the outer surfaces of the coil containing the glue dots 22' being removed from the inner surfaces of the walls 36.

A slot 43 at one end of the upper wall 36 allows a portion of the carrier strip 14 to be threaded from within the container 34 out of the slot 43 and across the upper wall 36 with the glue dots 22' exposed on the upper surface of the carrier strip 14. The upper wall 36 provides an anvil surface supporting the carrier strip 14 against pressure when a card 42 or the like is pressed down as indicated by arrow 44 against the upper surface of the carrier strip 14 to receive a glue dot 22'.

As a result of the earlier removal of the glue dots 22' on the carrier strip 14, only a single dot 22' will be exposed on the upper surface of the container 34 at a time simplifying this attachment process.

The portion of the carrier strip 14 previously having its dots 22' removed may be received within a slot 46 in a side wall 36 adjacent to the top wall 36 and then threaded out of a similar slot 48 positioned below slot 46 to permit sliding of the carrier strip 14 for the dispensing of additional dots 22 while preventing general looseness of the carrier strip 14 such as would promote unwinding of the coil 30 unintentionally.

Referring to FIG. 5, the container 34 may be used for manual dispensing or may be placed within an automatic dispensing system 50. Such a system includes a rigid container sleeve 52, holding the lower portion of the container 34, and a motor drive unit 54 receiving the carrier strip 14 after dots have been removed and incrementing the tape by a predetermined amount with a pressing of a palm sized push button 56. With each pressing of the button 56, the motor drive unit 54 increments the carrier strip 14 by the interdot spacing so as to expose a single dot 22' at the top of the container 34.

Referring now to FIG. 6 in an alternative dispensing method, the coil 30 may be carried on a semi-automatic affixing tool 58. A foot portion 60 of the tool 58 is placed at the top of a carrier sheet 63 where an adhesive dot will be placed. A plunger assembly 62 attached to slide up and down with respect to the foot portion 60 and biased upward with helical tension springs (not shown) so as to normally be held away from the carrier sheet 63 prior to the dispensing action. Plunger assembly 62 has a handle 64 exposed above the coil 30 and connected to a hanger 66 holding coil for rotation about hanger 66. A lower portion of the plunger assembly 62 includes a convex elastomeric anvil surface 68 flanked by rollers 70. The rollers 70 guide the carrier strip 14 downward across the lower surface of the anvil 68 which contacts the inner surface 18 of the carrier strip and up between pinch rollers 72 which grasp the portion of the carrier strip 14 after dots have been removed.

Referring now to FIG. 7, the handle 64 may be grasped and pressed downward toward the carrier sheet 63 as indicated by arrow 74. The pinch rollers 72 are mounted to be fixed in height with respect to the foot portion 60 and to rotate only in a manner that would pull tape from the coil 30. Hence, with downward motion of the plunger assembly 62, the anvil 68 moves towards the carrier sheet 63 simultaneously causing the unwinding of carrier strip 14 from the coil 30 such that at the moment the anvil 68 strikes the carrier sheet 63, a glue dot 22' is positioned immediately beneath the anvil 68 to be attached to the carrier sheet 63.

Referring now to FIG. 8, the handle 64 may be pulled upward aided by the springs (not shown) between the foot portions 60 and the plunger assembly 62, at which time a ratchet lever (not shown) interconnecting the plunger assembly 62 and the foot portion 60 causes a partial rotation of the pinch rollers 72 in response to the movement of the plunger assembly 62 with respect to the foot portion 60. This rotation of the pinch rollers 72 advances the carrier strip 14 to remove slack and cause it to remain abutted to the anvil 68 in preparation for a new actuation sequence.

Thus the tape of the present invention provides a simple method for dispensing dots of glue for joining materials together without the need for equipment or exposure to heated thermoplastic materials.

The above description has been that of a preferred embodiment of the present invention. It will occur to those that practice the art that many modifications may be made without departing from the spirit and scope of the invention. For example, a separate release strip may be wound into the coils of the dots to avoid the need for a carrier strip having opposed release surfaces. Glue dots having shapes other than disks may be produced by the appropriate dispensing nozzles. In order to apprise the public of the various embodiments that may fall within the scope of the invention, the following claims are made.

What is claimed is:

1. A thermoplastic adhesive dispensing tape comprising:
a flexible carrier tape having a transverse width and a longitudinal length including a plurality of contiguous longitudinal segments extending along the entire longitudinal length of said carrier tape, each of said longitudinal segments extending the entire transverse width of said flexible carrier tape, said flexible carrier tape also having opposed first and second release surfaces; and
a plurality of thermoplastic hot melt adhesive segments arrayed non-contiguously on said first release surface of said carrier tape along the longitudinal length of said carrier tape;
wherein only a single one of said adhesive segments is disposed within each of said longitudinal segments on said first release surface of said carrier tape; and
wherein each of said adhesive segments is individually exposable to an abutting planar surface when said carrier tape is transversely flexed.

2. The thermoplastic adhesive dispensing tape as defined in claim 1, wherein said thermoplastic adhesive segments adhere less strongly to said second release surface than they do to said first release surface, whereby said carrier tape may be unwound from a coil with said thermoplastic adhesive segments being retained on said first release surface.

3. A thermoplastic adhesive dispensing tape as defined in claim 1, wherein each of said adhesive segments are disposed at a point that is centered along said transverse width of said first release surface of said carrier tape, wherein said adhesive segments form a single line in the longitudinal direction along said carrier tape.

4. A thermoplastic adhesive dispensing tape as defined in claim 1, wherein said adhesive segments are disk-shaped.

5. The thermoplastic adhesive dispensing tape as defined in claim 4, wherein said disk-shaped adhesive segments have a diameter measured along said first release surface and are separated in the longitudinal direction by a distance at least equal to their diameter.

6. The thermoplastic adhesive dispensing tape as defined in claim 4, wherein said disk-shaped adhesive segments have a diameter and are separated in the longitudinal direction by a margin at least three times the diameter of the disk-shaped adhesive segments.

7. A thermoplastic adhesive dispensing tape comprising:
a flexible carrier tape, said carrier tape having a transverse width defined by first and second edges and a longitudinal length including a plurality of contiguous longitudinal segments extending along the entire longitudinal length of said carrier tape, each of said longitudinal segments extending from said first edge to said second edge of said transverse width of said carrier tape, said flexible carrier tape also having opposed first and second release surfaces; and
a plurality of thermoplastic hot melt adhesive segments non-contiguously arrayed on said first release surface of said carrier tape along the longitudinal length of said carrier tape;
wherein only a single one of said adhesive segments is arrayed within each of said longitudinal segments on said first release surface of said carrier tape;
wherein said thermoplastic adhesive segments adhere less strongly to said second release surface than they do to said first release surface, wherein said carrier tape may be unwound from a coil with said thermoplastic adhesive segments being retained on said first release surface; and
wherein each of said adhesive segments is individually exposable to an abutting planar surface when said carrier tape is transversely flexed.

8. The thermoplastic adhesive dispensing tape as defined in claim 7, wherein said thermoplastic adhesive segments are each disks having a generally circular configuration.

9. The thermoplastic adhesive dispensing tape as defined in claim 8, wherein said thermoplastic adhesive segments have a diameter and are separated in the longitudinal direction by a distance at least equal to their diameter.

10. A thermoplastic adhesive dispensing tape comprising:
a flexible carrier tape, said carrier tape having a transverse width defined by first and second edges and a longitudinal length including a plurality of contiguous longitudinal segments extending along the entire length of said carrier tape, each of said longitudinal segments extending from the first edge to the second edge of the transverse width, said carrier tape also having opposed first and second release surfaces; and
a plurality of thermoplastic hot melt adhesive disks, each of said adhesive disks being non-contiguously located on said first release surface along the longitudinal length of said carrier tape between said first and said second edges of said transverse width;
wherein only a single one of said adhesive disks is disposed within each of said longitudinal segments on the first release surface of said carrier tape; and wherein each of said adhesive disks is individually exposable to an abutting planar surface when said carrier tape is transversely flexed.

11. The thermoplastic adhesive dispensing tape as defined in claim 10 wherein:
said thermoplastic adhesive disks adhere less strongly to said second release surface than they do to said first release surface;
whereby said carrier tape may be unwound from a coil with said thermoplastic adhesive disks being retained on said first release surface.

12. A thermoplastic adhesive dispensing tape as defined in claim 10, wherein each of said adhesive disks is transversely centered between said first and second edges of said transverse width on said first release surface of said carrier tape, wherein said adhesive disks form a single line in the longitudinal direction along said carrier tape.

13. A thermoplastic adhesive dispensing tape as defined in claim 10, wherein each of said adhesive disks is non-contiguously placed on said first release surface along said transverse width, wherein said adhesive disks alternate between a first position nearer said first edge of said transverse width than said second edge of said transverse width and a second position near said second edge of said transverse width than said first edges of said transverse width, said plurality of adhesive disks extending non-contiguously in the longitudinal direction along said first release surface of said carrier tape.

14. A thermoplastic adhesive dispensing tape as defined in claim 10, wherein said adhesive disks are circular in configuration.

15. The thermoplastic adhesive dispensing tape as defined in claim 14, wherein said adhesive disks have a diameter measured along said first release surface and are separated in the longitudinal direction by a margin at least equal to the diameter.

16. The thermoplastic adhesive dispensing tape as defined in claim 15, wherein said adhesive disks have a diameter measured along said first release surface and are separated in the longitudinal direction by a margin at least three times the diameter of the circular disks.

17. A thermoplastic adhesive dispensing tape, comprising:
a flexible carrier tape, said carrier tape having a transverse width and a longitudinal length including a plurality of longitudinal segments extending along the entire length of said carrier tape, each of said longitudinal segments extending the entire transverse width of said carrier tape, said carrier tape also having opposed first and second release surfaces, said second release surface of said flexible carrier tape tending to adhere less strongly to thermoplastic adhesive material than does said first release surface of said flexible carrier tape; and
a plurality of thermoplastic hot melt adhesive segments arrayed non-contiguously on said first release surface of said flexible carrier tape along the longitudinal length of said carrier tape;
wherein each of said adhesive segments is disposed within one of said longitudinal segments on said first release surface of said flexible carrier tape which is longitudinally spaced apart from other every other adhesive segment on said first release surface of said flexible carrier tape; and
wherein each of said adhesive segments is individually exposable to an abutting planar surface when said carrier tape is transversely flexed.

18. A thermoplastic adhesive dispensing tape as defined in claim 17, wherein said adhesive segments are each disposed on said flexible carrier tape at one of at least two transversely separated locations.

19. A thermoplastic adhesive dispensing tape, comprising:
a flexible carrier tape, said carrier tape having a transverse width and a longitudinal length including a plurality of longitudinal segments extending along the entire length of said carrier tape, each of said longitudinal segments extending the entire transverse width of said carrier tape, said carrier tape also having opposed first and second release surfaces; and
a plurality of thermoplastic hot melt adhesive segments arrayed non-contiguously on said first release surface of said flexible carrier tape along the longitudinal length of said carrier tape;
wherein only a single one of said adhesive segments is disposed within each of said longitudinal segments on said first release surface of said carrier tape with longitudinally consecutive ones of said adhesive segments being spaced apart at uniform intervals;
wherein each of said adhesive segments are disposed on said flexible carrier tape within one of said longitudinal segments at one of at least two transversely separated locations; and
wherein each of said adhesive segments is individually exposable to an abutting planar surface when said carrier tape is transversely flexed.

20. A thermoplastic adhesive dispensing tape as defined in claim 19, wherein said second release surface of said flexible carrier tape tends to adhere less strongly to thermoplastic adhesive material than does said first release surface of said flexible carrier tape.

21. A thermoplastic adhesive dispensing tape as defined in claim 19, wherein said flexible carrier tape is longitudinally slit into at least two separate portions each having adhesive segments thereupon.

22. A thermoplastic adhesive dispensing tape comprising:
a flexible carrier tape having a transverse width and a longitudinal length including a plurality of contiguous longitudinal segments extending along the entire longitudinal length of said carrier tape, each of said longitudinal segments extending the entire transverse width of said flexible carrier tape, said flexible carrier tape also having opposed first and second release surfaces; and
a plurality of pressure-sensitive adhesive segments arrayed non-contiguously on said first release surface of said carrier tape along the longitudinal length of said carrier tape;
wherein only a single one of said adhesive segments is disposed within each of said longitudinal segments on said first release surface of said carrier tape; and
wherein each of said adhesive segments is individually exposable to an abutting planar surface when said carrier tape is transversely flexed.

23. The thermoplastic adhesive dispensing tape as defined in claim 22, wherein said adhesive segments adhere less strongly to said second release surface than they do to said first release surface, whereby said carrier tape may be unwound from a coil with said adhesive segments being retained on said first release surface.

24. A thermoplastic adhesive dispensing tape as defined in claim 22, wherein each of said adhesive segments are disposed at a point that is centered along said transverse width of said first release surface of said carrier tape, wherein said adhesive segments form a single line in the longitudinal direction along said carrier tape.

25. A thermoplastic adhesive dispensing tape as defined in claim 22, wherein said adhesive segments are disk-shaped.

26. The thermoplastic adhesive dispensing tape as defined in claim 25, wherein said disk-shaped adhesive segments have a diameter measured along said first release surface and are separated in the longitudinal direction by a distance at least equal to their diameter.

27. The thermoplastic adhesive dispensing tape as defined in claim 25, wherein said disk-shaped adhesive segments have a diameter and are separated in the longitudinal direction by a margin at least three times the diameter of the disk-shaped adhesive segments.

28. A thermoplastic adhesive dispensing tape comprising:
   a flexible carrier tape, said carrier tape having a transverse width defined by first and second edges and a longitudinal length including a plurality of contiguous longitudinal segments extending along the entire longitudinal length of said carrier tape, each of said longitudinal segments extending from said first edge to said second edge of said transverse width of said carrier tape, said flexible carrier tape also having opposed first and second release surfaces; and
   a plurality of pressure-sensitive adhesive segments non-contiguously arrayed on said first release surface of said carrier tape along the longitudinal length of said carrier tape;
      wherein only a single one of said adhesive segments is arrayed within each of said longitudinal segments on said first release surface of said carrier tape;
      wherein said adhesive segments adhere less strongly to said second release surface than they do to said first release surface, wherein said carrier tape may be unwound from a coil with said thermoplastic adhesive segments being retained on said first release surface; and
      wherein each of said adhesive segments is individually exposable to an abutting planar surface when said carrier tape is transversely flexed.

29. The thermoplastic adhesive dispensing tape as defined in claim 28, wherein said adhesive segments are each disks having a generally circular configuration.

30. The thermoplastic adhesive dispensing tape as defined in claim 29, wherein said adhesive segments have a diameter and are separated in the longitudinal direction by a distance at least equal to their diameter.

31. A thermoplastic adhesive dispensing tape comprising:
   a flexible carrier tape, said carrier tape having a transverse width defined by first and second edges and a longitudinal length including a plurality of contiguous longitudinal segments extending along the entire length of said carrier tape, each of said longitudinal segments extending from the first edge to the second edge of the transverse width, said carrier tape also having opposed first and second release surfaces; and
   a plurality of pressure-sensitive adhesive disks, each of said adhesive disks being non-contiguously located on said first release surface along the longitudinal length of said carrier tape between said first and said second edges of said transverse width;
      wherein only a single one of said adhesive disks is disposed within each of said longitudinal segments on the first release surface of said carrier tape; and
      wherein each of said adhesive disks is individually exposable to an abutting planar surface when said carrier tape is transversely flexed.

32. The thermoplastic adhesive dispensing tape as defined in claim 31 wherein:
   said adhesive disks adhere less strongly to said second release surface than they do to said first release surface;
   whereby said carrier tape may be unwound from a coil with said adhesive disks being retained on said first release surface.

33. A thermoplastic adhesive dispensing tape as defined in claim 31, wherein each of said adhesive disks is transversely centered between said first and second edges of said transverse width on said first release surface of said carrier tape, wherein said adhesive disks form a single line in the longitudinal direction along said carrier tape.

34. A thermoplastic adhesive dispensing tape as defined in claim 31, wherein each of said adhesive disks is non-contiguously placed on said first release surface along said transverse width, wherein said adhesive disks alternate between a first position nearer said first edge of said transverse width than said second edge of said transverse width and a second position near said second edge of said transverse width than said first edges of said transverse width, said plurality of adhesive disks extending non-contiguously in the longitudinal direction along said first release surface of said carrier tape.

35. A thermoplastic adhesive dispensing tape as defined in claim 31, wherein said adhesive disks are circular in configuration.

36. The thermoplastic adhesive dispensing tape as defined in claim 35, wherein said adhesive disks have a diameter measured along said first release surface and are separated in the longitudinal direction by a margin at least equal to the diameter.

37. The thermoplastic adhesive dispensing tape as defined in claim 36, wherein said adhesive disks have a diameter measured along said first release surface and are separated in the longitudinal direction by a margin at least three times the diameter of said circular adhesive disks.

38. A thermoplastic adhesive dispensing tape, comprising:
   a flexible carrier tape, said carrier tape having a transverse width and a longitudinal length including a plurality of longitudinal segments extending along the entire length of said carrier tape, each of said longitudinal segments extending the entire transverse width of said carrier tape, said carrier tape also having opposed first and second release surfaces, said second release surface of said flexible carrier tape tending to adhere less strongly to thermoplastic adhesive material than does said first release surface of said flexible carrier tape; and
   a plurality of pressure-sensitive adhesive segments arrayed non-contiguously on said first release surface of said flexible carrier tape along the longitudinal length of said carrier tape;
      wherein each of said adhesive segments is disposed within one of said longitudinal segments on said first release surface of said flexible carrier tape which is longitudinally spaced apart from other every other adhesive segment on said first release surface of said flexible carrier tape; and
      wherein each of said adhesive segments is individually exposable to an abutting planar surface when said carrier tape is transversely flexed.

39. A thermoplastic adhesive dispensing tape as defined in claim 38, wherein said adhesive segments are each disposed on said flexible carrier tape at one of at least two transversely separated locations.

40. A thermoplastic adhesive dispensing tape, comprising:
   a flexible carrier tape, said carrier tape having a transverse width and a longitudinal length including a plurality of longitudinal segments extending along the entire length of said carrier tape, each of said longitudinal segments extending the entire transverse width of said carrier tape, said carrier tape also having opposed first and second release surfaces; and a plurality of pressure-sensitive adhesive segments arrayed non-contiguously on said first release surface of said flexible carrier tape along the longitudinal length of said carrier tape;

wherein only a single one of said adhesive segments is disposed within each of said longitudinal segments on said first release surface of said carrier tape with longitudinally consecutive ones of said adhesive segments being spaced apart at uniform intervals;

wherein only a single one of said adhesive segments is disposed on said flexible carrier tape within each of said longitudinal segments at one of at least two transversely separated locations; and wherein each of said adhesive segments is individually exposable to an abutting planar surface when said carrier tape is transversely flexed.

41. A thermoplastic adhesive dispensing tape as defined in claim 40, wherein said second release surface of said flexible carrier tape tends to adhere less strongly to said adhesive segments than does said first release surface of said flexible carrier tape.

42. A thermoplastic adhesive dispensing tape as defined in claim 40, wherein said flexible carrier tape is longitudinally slit into at least two separate portions each having adhesive segments thereupon.

* * * * *